(12) United States Patent
Hong et al.

(10) Patent No.: US 12,374,254 B2
(45) Date of Patent: *Jul. 29, 2025

(54) POWER MANAGEMENT CIRCUIT AND DISPLAY DEVICE INCLUDING THE SAME

(71) Applicant: Samsung Display Co., Ltd., Yongin-Si (KR)

(72) Inventors: Jin-Taek Hong, Hwaseong-si (KR); Sungchun Park, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/655,323

(22) Filed: May 6, 2024

(65) Prior Publication Data

US 2024/0290236 A1 Aug. 29, 2024

Related U.S. Application Data

(63) Continuation of application No. 17/993,966, filed on Nov. 24, 2022, now Pat. No. 11,978,376.

(30) Foreign Application Priority Data

Feb. 10, 2022 (KR) .................. 10-2022-0017753

(51) Int. Cl.
*G09G 3/20* (2006.01)
*H02H 1/00* (2006.01)
*H02H 7/12* (2006.01)
*H02M 1/00* (2007.01)
*H02M 3/158* (2006.01)

(52) U.S. Cl.
CPC ............ *G09G 3/20* (2013.01); *H02H 1/0007* (2013.01); *H02H 7/12* (2013.01); *H02M 1/0009* (2021.05); *H02M 3/158* (2013.01); *G09G 2330/021* (2013.01); *G09G 2330/04* (2013.01)

(58) Field of Classification Search
CPC ................. G09G 2330/021; G06F 1/26–3296
See application file for complete search history.

(56) References Cited

U.S. PATENT DOCUMENTS

| | | | | |
|---|---|---|---|---|
| 8,278,997 B1 * | 10/2012 | Kim | ........................... | G06F 1/26 |
| | | | | 327/541 |
| 8,373,396 B2 * | 2/2013 | Huang | ...................... | G05F 1/56 |
| | | | | 323/270 |
| 9,236,035 B1 * | 1/2016 | Kim | ........................... | G09G 5/36 |
| 9,892,670 B2 * | 2/2018 | Seo | ........................... | G09G 3/20 |
| 10,218,266 B2 * | 2/2019 | Park | ..................... | G09G 3/3208 |
| 11,226,666 B2 * | 1/2022 | Hsu | ........................ | H02M 1/36 |

(Continued)

*Primary Examiner* — Amy Onyekaba
(74) *Attorney, Agent, or Firm* — Innovation Counsel LLP

(57) ABSTRACT

A power management circuit is disclosed that includes a boost converter, a pass transistor, and an overcurrent detect circuit. The boost converter is configured to convert an input voltage into a first power supply voltage. The pass transistor is configured to transfer the first power supply voltage as a second power supply voltage after a predetermined time from a time point at which the first power supply voltage is activated. The overcurrent detect circuit is configured to perform an overcurrent detect operation by sensing a current flowing through the pass transistor. A display device is also disclosed that includes the power management circuit.

20 Claims, 11 Drawing Sheets

(56) References Cited

U.S. PATENT DOCUMENTS

| | | | |
|---|---|---|---|
| 11,727,866 B2* | 8/2023 | Kim | G09G 3/3225 345/691 |
| 2008/0037306 A1* | 2/2008 | Marhefka | G09G 3/3696 363/149 |
| 2014/0111173 A1* | 4/2014 | Lee | G05F 1/565 323/281 |
| 2014/0285089 A1* | 9/2014 | Akahoshi | H05B 47/25 323/284 |
| 2015/0043256 A1* | 2/2015 | Domingo | H02H 7/1227 363/52 |
| 2015/0154917 A1* | 6/2015 | Jung | G09G 3/342 345/102 |
| 2015/0188431 A1* | 7/2015 | Cho | G09G 3/3225 345/212 |
| 2015/0349519 A1* | 12/2015 | Li | H02H 7/1213 361/86 |
| 2016/0078818 A1* | 3/2016 | Kang | G09G 3/3291 323/280 |
| 2016/0293106 A1* | 10/2016 | Seo | G09G 3/20 |
| 2017/0097649 A1* | 4/2017 | Lee | G05F 1/575 |
| 2017/0248980 A1* | 8/2017 | Hanson | G06F 11/3414 |
| 2017/0279359 A1* | 9/2017 | Goncalves | H02M 3/1584 |
| 2018/0138806 A1* | 5/2018 | Jeon | G06F 1/30 |
| 2018/0267583 A1* | 9/2018 | Hatakenaka | H02J 7/02 |
| 2018/0270944 A1* | 9/2018 | Hatakenaka | H05K 1/18 |
| 2018/0270985 A1* | 9/2018 | Shiraga | H02H 9/001 |
| 2019/0228694 A1* | 7/2019 | Lee | G09G 3/20 |
| 2020/0294438 A1* | 9/2020 | Lee | G09G 3/20 |
| 2020/0295558 A1* | 9/2020 | Shamim | H02H 3/08 |
| 2020/0394966 A1* | 12/2020 | Lim | G09G 3/3688 |
| 2021/0201792 A1* | 7/2021 | Lee | G09G 3/3258 |
| 2021/0281174 A1* | 9/2021 | Kang | H02M 1/32 |
| 2022/0308649 A1* | 9/2022 | Hosono | G06F 1/28 |
| 2023/0066436 A1* | 3/2023 | Rutkowski | H02M 1/0095 |

* cited by examiner

FIG. 4

| RCL_CODE | RCL |
|---|---|
| 00 | 100 mA |
| 01 | 200 mA |
| 10 | 300 mA |
| 11 | 400 mA |

FIG. 5

| RHT_CODE | RHT |
|---|---|
| 0 | 0.5 ms |
| 1 | 1 ms |

POWER MANAGEMENT CIRCUIT AND DISPLAY DEVICE INCLUDING THE SAME

CROSS-REFERENCE TO RELATED APPLICATION(S)

This application is a continuation application of U.S. patent application Ser. No. 17/993,966 filed on Nov. 24, 2022, now U.S. Pat. No. 11,978,376, which claims priority under 35 USC § 119 to Korean Patent Application No. 10-2022-0017753, filed on Feb. 10, 2022, in the Korean Intellectual Property Office (KIPO), the contents of which are herein incorporated by reference in their entireties.

BACKGROUND

1. Field

The present inventive concept relates to a power management circuit and to a display device including a power management circuit.

2. Description of the Related Art

A display device may include a power management circuit that generates power supply voltages suitable for driving a display panel based on an input voltage, such as a battery voltage or a system voltage. For example, the power management circuit may generate power supply voltages supplied to a display panel, a data driver, a scan driver and a controller by performing a boosting operation on the input voltage.

The power management circuit should be deactivated when a short defect (or a short circuit defect) occurs in the display device. However, in a case where a minute short defect occurs in a conventional display device, the power management circuit may not be deactivated.

SUMMARY

Some embodiments provide a power management circuit capable of being deactivated even if a minute short defect occurs.

Some embodiments provide a display device including a power management circuit capable of being deactivated even if a minute short defect occurs.

An embodiment of a power management circuit includes a boost converter configured to convert an input voltage into a first power supply voltage, a pass transistor configured to transfer the first power supply voltage as a second power supply voltage after a predetermined time from a time point at which the first power supply voltage is activated, and an overcurrent detect circuit configured to perform an overcurrent detect operation by sensing a current flowing through the pass transistor.

The first power supply voltage may be used to generate a high gate voltage and a gamma voltage, and the second power supply voltage may be used as a power supply voltage for an output buffer of a data driver included in the display device.

The overcurrent detect circuit may include a sensing transistor through which a proportion current that is proportional to the current flowing through the pass transistor flows, may compare a current sensing voltage corresponding to the proportion current of the sensing transistor with a reference voltage corresponding to a reference current level, and may generate an overcurrent detect signal in a case where the current sensing voltage is higher than the reference voltage.

the reference current level may be set by a register option.

The overcurrent detect circuit may generate the overcurrent detect signal in a case where the current sensing voltage is maintained to be higher than the reference voltage for a reference hold time.

The reference hold time may be set by a register option.

The power management circuit may further include a gate voltage generator configured to generate a gate voltage applied to a gate of the pass transistor. The gate voltage generator may generate the gate voltage having an active level after the predetermined time from the time point at which the first power supply voltage is activated, and may generate the gate voltage having an inactive level in response to the overcurrent detect signal.

The predetermined time from the time point at which the first power supply voltage is activated to a time point at which the second power supply voltage is started to be activated may be set by a register option.

The overcurrent detect circuit may include a sensing transistor including a gate for receiving a gate voltage applied to a gate of the pass transistor, a first terminal coupled to a first terminal of the pass transistor, and a second terminal, an operational amplifier including a first input terminal coupled to the second terminal of the sensing transistor, a second input terminal coupled to a second terminal of the pass transistor, and an output terminal, an output transistor including a gate coupled to the output terminal of the operational amplifier, a first terminal coupled to the second terminal of the sensing transistor, and a second terminal coupled to an output node, an output resistor coupled between the output node and a ground voltage line, and a comparator including a first input terminal coupled to the output node, a second input terminal for receiving a reference voltage corresponding to a reference current level, and an output terminal for outputting an overcurrent detect signal.

In a case where an overcurrent of the pass transistor is detected by the overcurrent detect operation, the second power supply voltage may be deactivated, and the first power supply voltage may be maintained as an active state.

The boost converter may include an inductor including a first terminal for receiving the input voltage, and a second terminal, a first switching transistor including a gate for receiving a first switching signal, a first terminal coupled to the second terminal of the inductor, and a second terminal coupled to a ground voltage line, a second switching transistor including a gate for receiving a second switching signal, a first terminal coupled to the second terminal of the inductor, and a second terminal coupled to a first output node at which the first power supply voltage is output, a first feedback circuit coupled between the first output node and the ground voltage line, and configured to generate a first feedback voltage based on the first power supply voltage, a current sensing circuit configured to generate an inductor current sensing voltage corresponding to a current flowing from the inductor through the first switching transistor, a comparator including a first input terminal for receiving the inductor current sensing voltage, a second terminal for receiving the first feedback voltage, and an output terminal for outputting an output signal, and a switching signal generator configured to generate the first switching signal and the second switching signal based on the output signal of the comparator.

Before the second power supply voltage is activated, the boost converter may adjust a voltage level of the first power supply voltage based on a first feedback voltage generated based on the first power supply voltage. After the second power supply voltage is activated, the boost converter may adjust the voltage level of the first power supply voltage based on a second feedback voltage generated based on the second power supply voltage. In a case where an overcurrent of the pass transistor is detected by the overcurrent detect operation, the boost converter may adjust the voltage level of the first power supply voltage based on the first feedback voltage.

The power management circuit may further include a second feedback circuit coupled between a second output node at which the second power supply voltage is output and a ground voltage line, and configured to generate a second feedback voltage based on the second power supply voltage. The boost converter may include an inductor including a first terminal for receiving the input voltage, and a second terminal, a first switching transistor including a gate for receiving a first switching signal, a first terminal coupled to the second terminal of the inductor, and a second terminal coupled to the ground voltage line, a second switching transistor including a gate for receiving a second switching signal, a first terminal coupled to the second terminal of the inductor, and a second terminal coupled to a first output node at which the first power supply voltage is output, a first feedback circuit coupled between the first output node and the ground voltage line, and configured to generate a first feedback voltage based on the first power supply voltage, a current sensing circuit configured to generate an inductor current sensing voltage corresponding to a current flowing from the inductor through the first switching transistor, a comparator including a first input terminal for receiving the inductor current sensing voltage, a second terminal, and an output terminal for outputting an output signal, a feedback select circuit configured to provide the first feedback voltage to the second input terminal of the comparator in response to a third switching signal, and to provide the second feedback voltage to the second input terminal of the comparator in response to a fourth switching signal, and a switching signal generator configured to generate the first switching signal and the second switching signal based on the output signal of the comparator.

Before the second power supply voltage is activated, the comparator may generate the output signal by comparing the inductor current sensing voltage with the first feedback voltage. After the second power supply voltage is activated, the comparator may generate the output signal by comparing the inductor current sensing voltage with the second feedback voltage. In a case where an overcurrent of the pass transistor is detected by the overcurrent detect operation, the comparator may generate the output signal by comparing the inductor current sensing voltage with the first feedback voltage.

Before the second power supply voltage is activated, the third switching signal may have an active level, and the fourth switching signal may have an inactive level. During a first time from a time point at which the second power supply voltage is activated, both of the third switching signal and the fourth switching signal may have the active level. After the first time, the third switching signal may have the inactive level, and the fourth switching signal may have the active level. During a second time from a time point at which an overcurrent of the pass transistor is detected, both of the third switching signal and the fourth switching signal may have the active level. After the second time, the third switching signal may have the active level, and the fourth switching signal may have the inactive level.

The boost converter may further include a short circuit comparator configured to generate a short circuit signal by comparing the inductor current sensing voltage with a short circuit reference voltage corresponding to a short circuit current level. The switching signal generator may change the first switching signal and the second switching signal to an inactive level in response to the short circuit signal.

An embodiment of a power management circuit includes a boost converter configured to convert an input voltage into a first power supply voltage, and including a first feedback circuit configured to generate a first feedback voltage based on the first power supply voltage, a pass transistor configured to transfer the first power supply voltage as a second power supply voltage after a predetermined time from a time point at which the first power supply voltage is activated, a second feedback circuit configured to generate a second feedback voltage based on the second power supply voltage, and an overcurrent detect circuit configured to perform an overcurrent detect operation by sensing a current flowing through the pass transistor.

The overcurrent detect circuit may include a sensing transistor through which a proportion current that is proportional to the current flowing through the pass transistor flows, may compare a current sensing voltage corresponding to the proportion current of the sensing transistor with a reference voltage corresponding to a reference current level, and may generate an overcurrent detect signal in a case where the current sensing voltage is higher than the reference voltage.

Before the second power supply voltage is activated, the boost converter may adjust a voltage level of the first power supply voltage based on the first feedback voltage. After the second power supply voltage is activated, the boost converter may adjust the voltage level of the first power supply voltage based on the second feedback voltage. In a case where an overcurrent of the pass transistor is detected by the overcurrent detect operation, the boost converter may adjust the voltage level of the first power supply voltage based on the first feedback voltage.

An embodiment of a display device includes a display panel including a plurality of pixels, a data driver configured to provide data signals to the plurality of pixels, a scan driver configured to provide scan signals to the plurality of pixels, a controller configured to control the data driver and the scan driver, and a power management circuit configured to supply a first power supply voltage and a second power supply voltage to the data driver and the scan driver. The power management circuit includes a boost converter configured to convert an input voltage into the first power supply voltage, a pass transistor configured to transfer the first power supply voltage as the second power supply voltage after a predetermined time from a time point at which the first power supply voltage is activated, and an overcurrent detect circuit configured to perform an overcurrent detect operation by sensing a current flowing through the pass transistor.

As described above, in a power management circuit and a display device according to embodiments, an overcurrent detect circuit may perform an overcurrent detect operation by sensing a current flowing through a pass transistor. Accordingly, even if a minute short defect related to a second power supply voltage transferred or activated by the pass transistor occurs, the power management circuit can deactivate the second power supply voltage.

Further, in the power management circuit and the display device according to embodiments, a boost converter may adjust a voltage level of a first power supply voltage (e.g., a pre-analog power supply voltage) according to a second feedback voltage generated based on the second power supply voltage (e.g., an analog power supply voltage) transferred or activated by the pass transistor. Accordingly, a voltage drop of the second power supply voltage caused by an on-resistance of the pass transistor may be compensated.

BRIEF DESCRIPTION OF THE DRAWINGS

Illustrative, non-limiting embodiments will be more clearly understood from the following detailed description in conjunction with the accompanying drawings.

FIG. 4 is a diagram illustrating an example of a reference current level that is to be set by a register option.

FIG. 5 is a diagram illustrating an example of a reference hold time that is to be set by a register option.

DETAILED DESCRIPTION OF THE EMBODIMENTS

Hereinafter, embodiments of the present inventive concept will be explained in detail with reference to the accompanying drawings.

Figure 1:
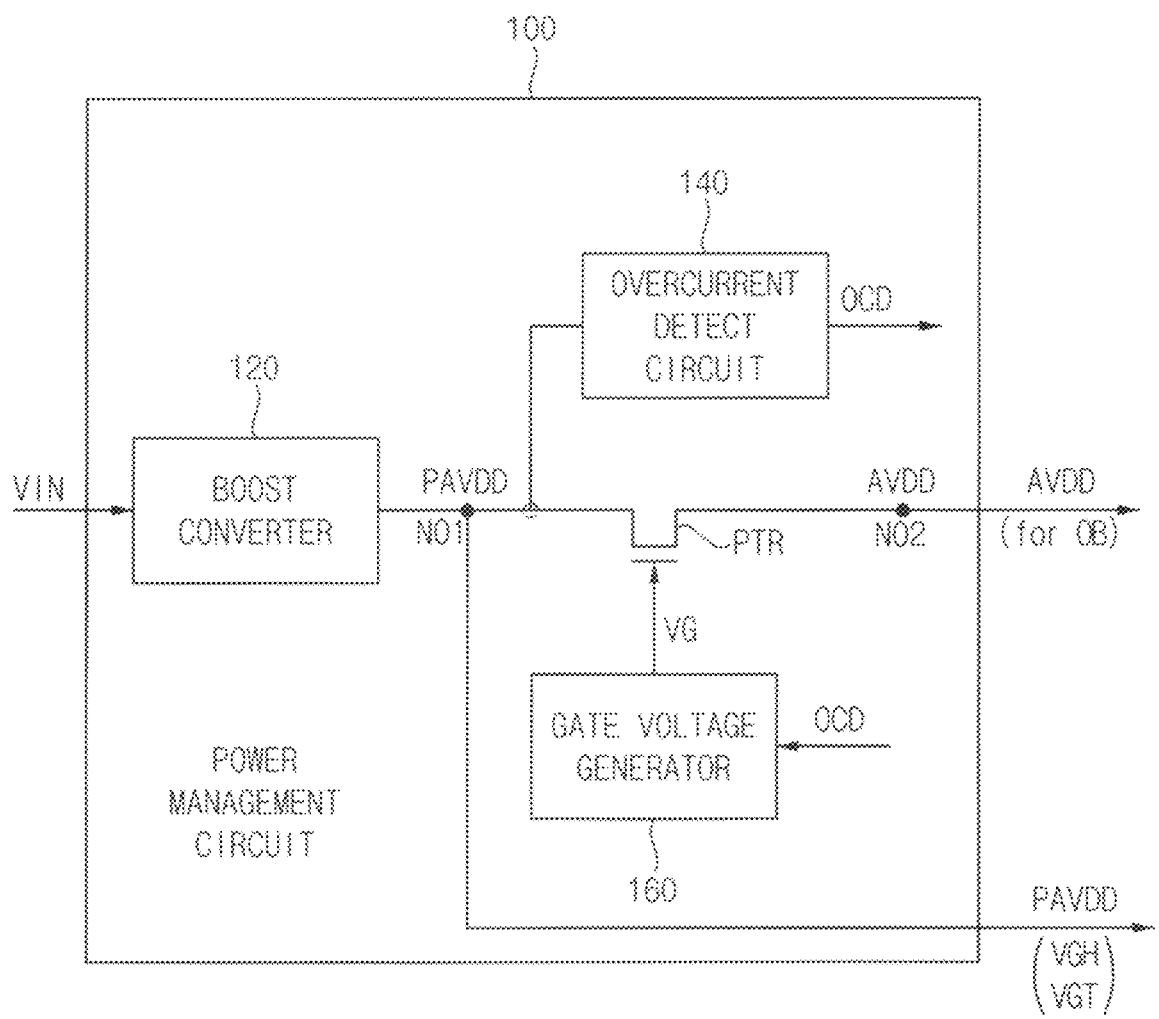
FIG. 1 is a block diagram illustrating a power management circuit according to embodiments.
Figure 2:
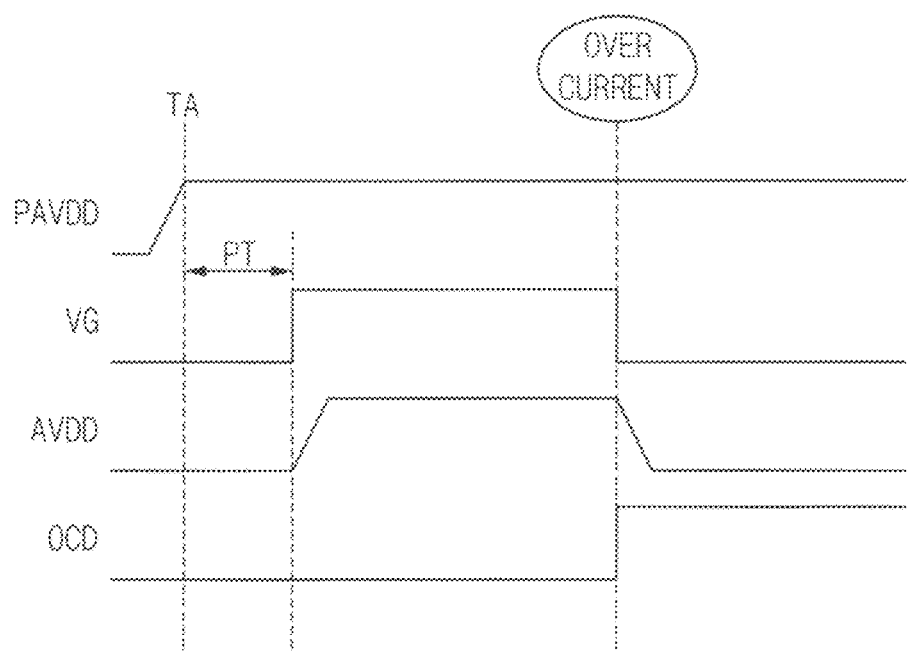
FIG. 2 is a timing diagram for describing an example of an operation of a power management circuit according to embodiments.

FIG. 1 is a block diagram illustrating a power management circuit according to embodiments, and FIG. 2 is a timing diagram for describing an example of an operation of a power management circuit according to embodiments.

Referring to FIG. 1, a power management circuit 100 in a display device according to embodiments may generate power supply voltages PAVDD and AVDD required for driving the display device based on an input voltage VIN. The power management circuit 100 may include a boost converter 120, a pass transistor PTR and an overcurrent detect circuit 140. In some embodiments, the power management circuit 100 may further include a gate voltage generator 160 that generate a gate voltage VG provided to the pass transistor PTR.

The boost converter 120 may convert the input voltage VIN into a first power supply voltage PAVDD. For example, the boost converter 120 may generate the first power supply voltage PAVDD having a relatively high voltage level by boosting the input voltage VIN having a relatively low voltage level. In some embodiments, the input voltage VIN may be, but not be limited to, a battery voltage or a system voltage of an electronic device including the display device. In some embodiments, the input voltage VIN may be used to generate a high gate voltage VGH and a gamma voltage. For example, the power management circuit 100 may output the first power supply voltage PAVDD as the high gate voltage VGH of a scan signal to a scan driver of the display device at a first output node NO1. In another example, the power management circuit 100 may generate the high gate voltage VGH based on the first power supply voltage PAVDD by using a regulator (e.g., a low dropout (LDO) regulator), and may output the high gate voltage VGH at the first output node NO1. Further, for example, the power management circuit 100 may output the first power supply voltage PAVDD as a gamma top voltage VGT to a data driver of the display device at the first output node NO1. In some example embodiments, a second power supply voltage AVDD may be referred to as an analog power supply voltage, and the first power supply voltage PAVDD may be referred to a pre-analog power supply voltage that is activated before the analog power supply voltage is activated.

The pass transistor PTR may transfer the first power supply voltage PAVDD at the first output node NO1 as the second power supply voltage AVDD to a second output node NO2 after a predetermined time from a time point at which the first power supply voltage PAVDD is activated. In some embodiments, the second power supply voltage AVDD may be used as a power supply voltage for an output buffer OB of the data driver included in the display device. In order that a display panel of the display device may display an image with desired luminance, the scan signal and the gamma voltage for generating a data signal applied to the display panel should have desired voltage levels before the output buffer OB outputs the data signal. Accordingly, the first power supply voltage PAVDD may be first activated, and then the second power supply voltage AVDD may be activated after the predetermined time.

In order that the first power supply voltage PAVDD is first activated and the second power supply voltage AVDD is activated later, the gate voltage generator 160 may provide the gate voltage VG having an active level to a gate of the pass transistor PTR after the predetermined time from the time point at which the first power supply voltage PAVDD is activated. For example, as illustrated in FIG. 2, the gate voltage VG provided to the gate of the pass transistor PTR may be changed to the active level (e.g., a high level) after the predetermined time PT from the time point TA at which the first power supply voltage PAVDD is activated. When the gate voltage VG has the active level, the pass transistor PTR may be turned on, and the turned-on pass transistor PTR may transfer the first power supply voltage PAVDD at the first output node NO1 as the second power supply voltage AVDD to the second output node NO2. In some embodiments, the predetermined time PT from the time point TA at which the first power supply voltage PAVDD is activated to a time point at which the second power supply voltage AVDD is started to be activated may be a fixed time. In other embodiments, the power management circuit 100 may include a register, and the predetermined time PT from the time point TA at which the first power supply voltage PAVDD is activated to the time point at which the second power supply voltage AVDD is started to be activated may be set by a register option, or by changing a setting value stored in the register.

The overcurrent detect circuit 140 may perform an overcurrent detect operation by sensing a current flowing through the pass transistor PTR. In some embodiments, the overcurrent detect circuit 140 may include a sensing transistor through which a proportion current that is proportional to the current flowing through the pass transistor PTR flows, may compare a current sensing voltage corresponding to the proportion current of the sensing transistor with a reference voltage corresponding to a reference current level, and may generate an overcurrent detect signal OCD in a case where the current sensing voltage is higher than the reference voltage. The gate voltage generator 160 may generate the gate voltage VG having an inactive level in response to the overcurrent detect signal OCD.

For example, as illustrated in FIG. 2, the first power supply voltage PAVDD may be first activated, and the second power supply voltage AVDD may be activated after the predetermined time PT from the time point TA at which the first power supply voltage PAVDD is activated. If the first power supply voltage PAVDD and the second power supply voltage AVDD are activated, the overcurrent detect circuit 140 may perform the overcurrent detect operation by sensing the current flowing through the pass transistor PTR. Once a short defect (or a short circuit defect) occurs in a line transferring the second power supply voltage AVDD, an overcurrent ("OVER CURRENT") may flow through the pass transistor PTR. If the overcurrent occurs, the overcurrent detect circuit 140 may generate the overcurrent detect signal OCD having the active level (e.g., the high level). The gate voltage generator 160 may change the gate voltage VG to the inactive level (e.g., a low level) in response to the overcurrent detect signal OCD. The pass transistor PTR may be turned off in response to the gate voltage VG having the inactive level, and the second power supply voltage AVDD may be deactivated. In some embodiments, as illustrated in FIG. 2, in a case where the overcurrent of the pass transistor PTR is detected by the overcurrent detect operation of the overcurrent detect circuit 140, the pass transistor PTR may be turned off, the second power supply voltage AVDD may be deactivated, and the first power supply voltage PAVDD may be maintained as an active state. Since the second power supply voltage AVDD is deactivated, but the first power supply voltage PAVDD is maintained as the active state, it can be readily identified that the short defect occurs in a portion (e.g., the line transferring the second power supply voltage AVDD) related to the second power supply voltage AVDD.

A conventional power management circuit may perform a short circuit detect operation or an overcurrent detect operation by sensing an inductor current flowing through an inductor in a boost converter. Further, in the conventional power management circuit, the boost converter may not be directly connected to a second output node at which a second power supply voltage is output, but may be connected to the second output node through a pass transistor. Thus, in a case where a minute short defect occurs at a line transferring the second power supply voltage, the conventional power management circuit may not detect the minute short defect, and may not deactivate the second power supply voltage.

However, in the power management circuit 100 according to embodiments, the overcurrent detect circuit 140 may perform the overcurrent detect operation by sensing the current flowing through the pass transistor PTR. Accordingly, even if the minute short defect related to the second power supply voltage AVDD transferred or activated by the pass transistor PTR occurs, the overcurrent of the pass transistor PTR may be readily detected, and the second power supply voltage AVDD may be deactivated.

Figure 3:
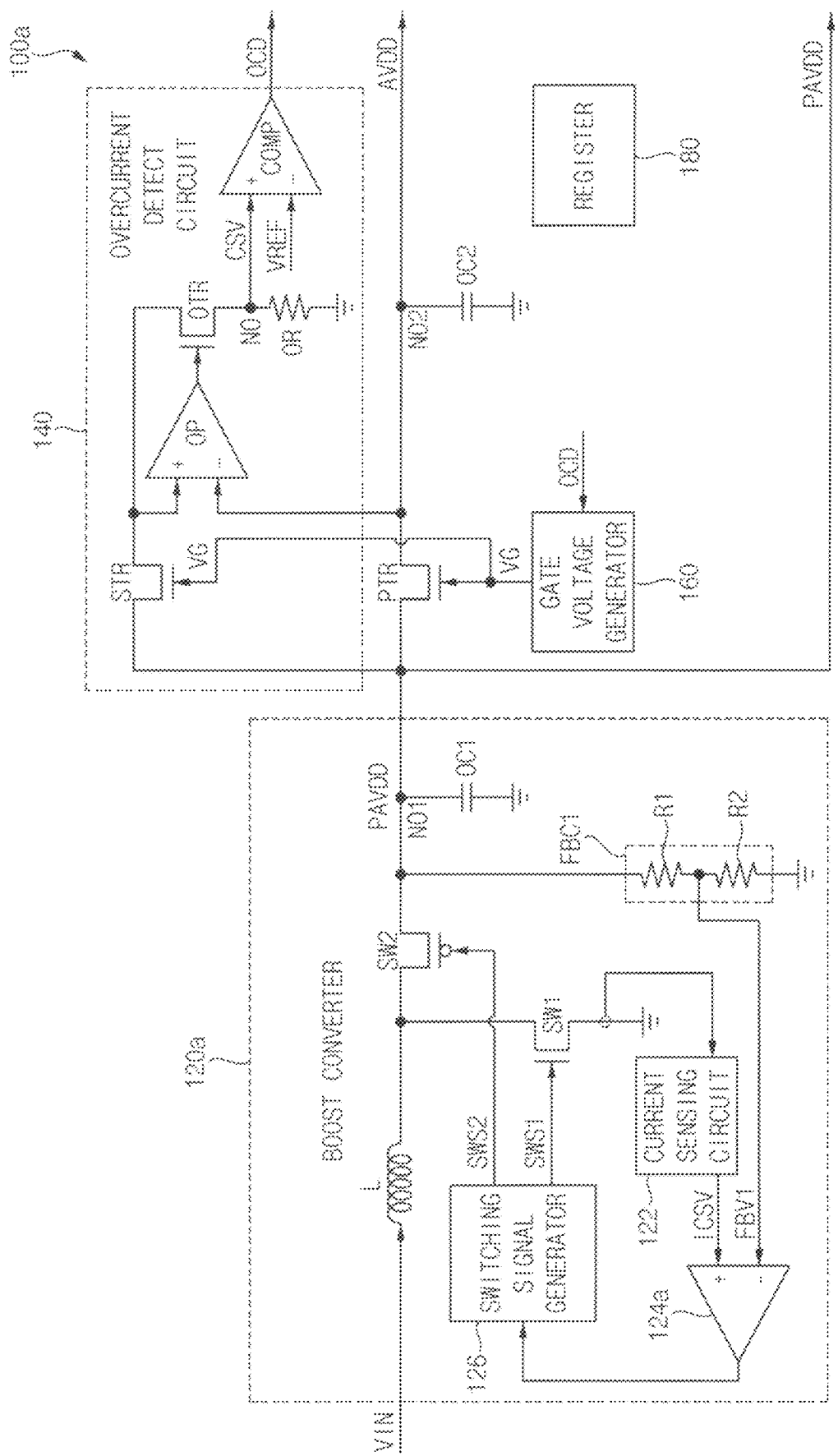
FIG. 3 is a diagram illustrating a power management circuit according to embodiments.

FIG. 3 is a diagram illustrating a power management circuit according to embodiments, FIG. 4 is a table illustrating an example of a reference current level that is to be set by a register option, and FIG. 5 is a table illustrating an example of a reference hold time that is to be set by a register option.

Referring to FIG. 3, a power management circuit 100a may include a boost converter 120a, a pass transistor PTR, an overcurrent detect circuit 140 and a gate voltage generator 160. In some embodiments, the boost converter 120a may include a first output capacitor OC1 coupled to a first output node NO1 at which a first power supply voltage PAVDD is output, and the power management circuit 100a may further include a second output capacitor OC2 coupled to a second output node NO2 at which a second power supply voltage AVDD is output. In some embodiments, the power management circuit 100a may further include a register 180 that stores setting values. Further, in some embodiments, the power management circuit 100a may be implemented as, but not limited to, a power management integrated circuit (PMIC).

The boost converter 120a may convert an input voltage VIN into the first power supply voltage PAVDD. To perform this operation, the boost converter 120a may include an inductor L, a first switching transistor SW1, a second switching transistor SW2, a first feedback circuit FBC1, a current sensing circuit 122, a comparator 124a and a switching signal generator 126. In some embodiments, the boost converter 120a may further include the first output capacitor OC1 coupled between the first output node NO1 and a ground voltage line to stabilize the first power supply voltage PAVDD.

The inductor L may include a first terminal for receiving the input voltage VIN, and a second terminal. The first switching transistor SW1 may couple the second terminal of the inductor L to the ground voltage line in response to a first switching signal SWS1. For example, the first switching transistor SW1 may include a gate for receiving the first switching signal SWS1, a first terminal coupled to the second terminal of the inductor L, and a second terminal coupled to the ground voltage line. The second switching transistor SW2 may couple the second terminal of the inductor L to the first output node NO1 in response to a second switching signal SWS2. For example, the second switching transistor SW2 may include a gate for receiving the second switching signal SWS2, a first terminal coupled to the second terminal of the inductor L, and a second terminal coupled to the first output node NO1 at which the first power supply voltage PAVDD is output. The first feedback circuit FBC1 may be coupled between the first output node NO1 and the ground voltage line, and may generate a first feedback voltage FBV1 based on the first power supply voltage PAVDD. In some embodiments, the first feedback circuit FBC1 may be implemented as a voltage divider, and may generate the first feedback voltage FBV1 by dividing the first power supply voltage PAVDD. For example, the first feedback circuit FBC1 may include a first resistor R1 coupled between the first output node NO1 and a node at which the first feedback voltage FBV1 is output, and a second resistor R2 coupled between the node at which the first feedback voltage FBV1 is output and the ground voltage line. The current sensing circuit 122 may sense a current flowing through the inductor L while the first switching transistor SW1 is turned on. Further, the current sensing circuit 122 may generate an inductor current sensing voltage ICSV corresponding to the current flowing from the inductor L through the first switching transistor SW1. The comparator 124a may generate an output signal by comparing the inductor current sensing voltage ICSV with the first feedback voltage FBV1. For example, the comparator 124a may include a first input terminal (e.g., a positive input terminal) for receiving the inductor current sensing voltage ICSV, a second terminal (e.g., a negative input terminal) for receiving the first feedback voltage FBV1, and an output terminal for outputting the output signal.

The switching signal generator 126 may generate the first switching signal SWS1 and the second switching signal SWS2 based on the output signal of the comparator 124a. The switching signal generator 126 may alternately activate the first switching signal SWS1 and the second switching signal SWS2 such that both of the first and second switching transistors SW1 and SW2 are not simultaneously turned on. Further, the switching signal generator 126 may generate the first switching signal SWS1 and the second switching signal SWS2 to allow the first power supply voltage PAVDD to have a desired voltage level. For example, when the first power supply voltage PAVDD is lower than the desired voltage level, the inductor current sensing voltage ICSV may be higher than the first feedback voltage FBV1 generated based on the first power supply voltage PAVDD, and the comparator 124a may output the output signal having a positive level. In response to the output signal having the positive level, the switching signal generator 126 may deactivate the first switching signal SWS1, and may activate the second switching signal SWS2. Accordingly, the second switching transistor SW2 may be turned on in response to the second switching signal SWS2 having an active level, and a voltage level of the first power supply voltage PAVDD may be increased. In another example, when the first power supply voltage PAVDD is higher than the desired voltage level, the inductor current sensing voltage ICSV may be lower than the first feedback voltage FBV1 generated based on the first power supply voltage PAVDD, and the comparator 124a may output the output signal having a negative level. In response to the output signal having the negative level, the switching signal generator 126 may activate the first switching signal SWS1, and may deactivate the second switching signal SWS2. Accordingly, the second switching transistor SW2 may be turned off in response to the second switching signal SWS2 having an inactive level, and a voltage level of the first power supply voltage PAVDD may be decreased.

Although FIG. 3 illustrates an example of a configuration of the boost converter 120a, the configuration of the boost converter 120a according to embodiments is not limited to the example of FIG. 3. Further, in some embodiments, at least a portion of passive elements of the power management circuit 100a, for example the inductor L, the first output capacitor OC1 and the second output capacitor OC2 may be located outside the PMIC, but the location of the passive elements is not limited thereto.

The gate voltage generator 160 may provide a gate voltage VG having an active level to a gate of the pass transistor PTR after a predetermined time from a time point at which the first power supply voltage PAVDD is activated, and the pass transistor PTR may transfer the first power supply voltage PAVDD at the first output node NO1 as the second power supply voltage AVDD to the second output node NO2 in response to the gate voltage VG having the active level. In some embodiments, the register 180 may store a setting value for setting the predetermined time, and the predetermined time from the time point at which the first power supply voltage PAVDD is activated to a time point at which the second power supply voltage AVDD is started to be activated may be set by a register option, or by changing the setting value stored in the register 180. The second output capacitor OC2 may be coupled between the second output node NO2 and the ground voltage line, and may stabilize the second power supply voltage AVDD.

The overcurrent detect circuit 140 may perform an overcurrent detect operation by sensing a current flowing through the pass transistor PTR. To perform this operation, the overcurrent detect circuit 140 may include a pass transistor current sensing circuit that generates a current sensing voltage CSV by sensing the current flowing through the pass transistor PTR, and a comparator COMP that generate an overcurrent detect signal OCD by comparing the current sensing voltage CSV with a reference voltage VREF. The pass transistor current sensing circuit may include a sensing transistor STR, an operational amplifier OP, an output transistor OTR and an output resistor OR.

The sensing transistor STR may include a gate for receiving the gate voltage VG applied to the gate of the pass transistor PTR, a first terminal coupled to a first terminal of the pass transistor PTR, and a second terminal. The operational amplifier OP may include a first input terminal (e.g., a positive input terminal) coupled to the second terminal of the sensing transistor STR, a second input terminal (e.g., a negative input terminal) coupled to a second terminal of the pass transistor PTR, and an output terminal. The output transistor OTR may include a gate coupled to the output terminal of the operational amplifier OP, a first terminal coupled to the second terminal of the sensing transistor STR, and a second terminal coupled to an output node NO. The output resistor may be coupled between the output node NO and the ground voltage line. The comparator COMP may include a first input terminal (e.g., a positive input terminal) coupled to the output node NO, a second input terminal (e.g., a negative input terminal) for receiving the reference voltage VREF corresponding to a reference current level, and an output terminal for outputting the overcurrent detect signal OCD.

The sensing transistor STR may be turned on when the pass transistor PTR is turned on, and a proportion current that is proportional to the current flowing through the pass transistor PTR may flow through the sensing transistor STR. That is, the gate of the sensing transistor STR and the gate of the pass transistor PTR receive substantially the same gate voltage VG, and thus the sensing transistor STR may be turned on while the pass transistor PTR is turned on. Further, the first terminal (e.g., a drain) of the sensing transistor STR and a first terminal (e.g., a drain) of the pass transistor PTR may be coupled to substantially the same node, or the first output node NO1, the second terminal (e.g., a source) of the sensing transistor STR may be coupled to the first input terminal (e.g., the positive input terminal) of the operational amplifier OP, and a second terminal (e.g., a source) of the pass transistor PTR may be coupled to the second input terminal (e.g., the negative input terminal) of the operational amplifier OP. Since the first and second input terminals of the operational amplifier OP may have substantially the same voltage, the sensing transistor STR and the pass transistor PTR may have substantially the same drain-source voltage. Since the sensing transistor STR and the pass transistor PTR has substantially the same drain-source voltage, a ratio of a current of the sensing transistor STR to a current of the pass transistor PTR may be determined by a ratio of a size (e.g., "a channel width (W)/a channel length (L)") of the sensing transistor STR to a size of the pass transistor PTR. For example, in a case where the sensing transistor STR and the pass transistor PTR have substantially the same size, a current substantially the same as the current of the pass transistor PTR may flow through the sensing transistor STR. In another example, in a case where the size of the sensing transistor STR is about one tenth of the size of the pass transistor PTR, a current corresponding to one tenth of the current of the pass transistor PTR may flow through the sensing transistor STR.

The output transistor OTR may be turned on in response to an output signal of the operational amplifier OP, and the current of the sensing transistor STR may flow through the turned-on output transistor OTR to the output resistor OR. If the current of the sensing transistor STR is provided to the output resistor OR, the output node NO may have the current sensing voltage CSV corresponding to the current of the sensing transistor STR. The comparator COMP may generate the overcurrent detect signal OCD by comparing the current sensing voltage CSV corresponding to the current of the sensing transistor STR, or the current of the pass transistor PTR, with the reference voltage VREF corresponding to a reference current level of an overcurrent. For example, in a case where the current sensing voltage CSV is higher than the reference voltage VREF, the comparator COMP may generate the overcurrent detect signal OCD having an active level.

In some embodiments, the reference current level may be set by a register option. For example, as shown in FIG. 4, the register 180 may store a reference current level code RCL_CODE for the reference current level RCL, and a voltage level of the reference voltage VREF (FIG. 3) may correspond to the reference current level RCL represented by the reference current level code RCL_CODE. In an example, the reference voltage VREF may have a voltage level corresponding to the reference current level RCL of about 100 mA in a case where the reference current level code RCL_CODE has a value of '00', the reference voltage VREF may have a voltage level corresponding to the reference current level RCL of about 200 mA in a case where the reference current level code RCL_CODE has a value of '01', the reference voltage VREF may have a voltage level corresponding to the reference current level RCL of about 300 mA in a case where the reference current level code RCL_CODE has a value of '10', and the reference voltage VREF may have a voltage level corresponding to the reference current level RCL of about 400 mA in a case where the reference current level code RCL_CODE has a value of '11'.

Further, in some embodiments, to avoid generating the overcurrent detect signal OCD based on a glitch of or a nose from the second power supply voltage AVDD or the current of the pass transistor PTR, the overcurrent detect circuit 140 may generate the overcurrent detect signal OCD in a case where the current sensing voltage CSV is maintained to be higher than the reference voltage VREF for a reference hold time. In some embodiments, the reference hold time may be set by a register option. For example, as illustrated in FIG. 5, the register 180 may store a reference hold time code RHT_CODE for the reference hold time RHT, and the overcurrent detect circuit 140 may determine whether the current sensing voltage CSV is maintained to be higher than the reference voltage VREF for the reference hold time RHT represented by the reference hold time code RHT_CODE. In an example, the overcurrent detect circuit 140 may determine whether the current sensing voltage CSV is maintained to be higher than the reference voltage VREF for the reference hold time RHT of about 0.5 ms in a case where the reference hold time code RHT_CODE has a value of '0', and may determine whether the current sensing voltage CSV is maintained to be higher than the reference voltage VREF for the reference hold time RHT of about 1 ms in a case where the reference hold time code RHT_CODE has a value of '1'. To perform this operation, in some embodiments, the overcurrent detect circuit 140 may further include, but not limited to, an overcurrent detect signal generating circuit that determines whether the output signal of the comparator 124a is maintained as the active level (e.g., a high level) for the reference hold time RHT, and that generates the overcurrent detect signal OCD having the active level in a case where the output signal of the comparator 124a is maintained as the active level for the reference hold time RHT.

If the overcurrent detect signal OCD having the active level is generated, the gate voltage generator 160 may change the gate voltage VG to an inactive level in response to the overcurrent detect signal OCD, the pass transistor PTR may be turned off in response to the gate voltage VG having the inactive level, and the second power supply voltage AVDD may be deactivated. In some embodiments, although the second power supply voltage AVDD is deactivated, the first power supply voltage PAVDD may be maintained as an active state.

In some embodiments, at least a portion of transistors included in the power management circuit 100a may be implemented with power transistors suitable for transferring power. For example, the first switching transistor SW1, the second switching transistor SW2, the pass transistor PTR and the sensing transistor STR may be implemented with, but not limited to, the power transistors.

Figure 6:
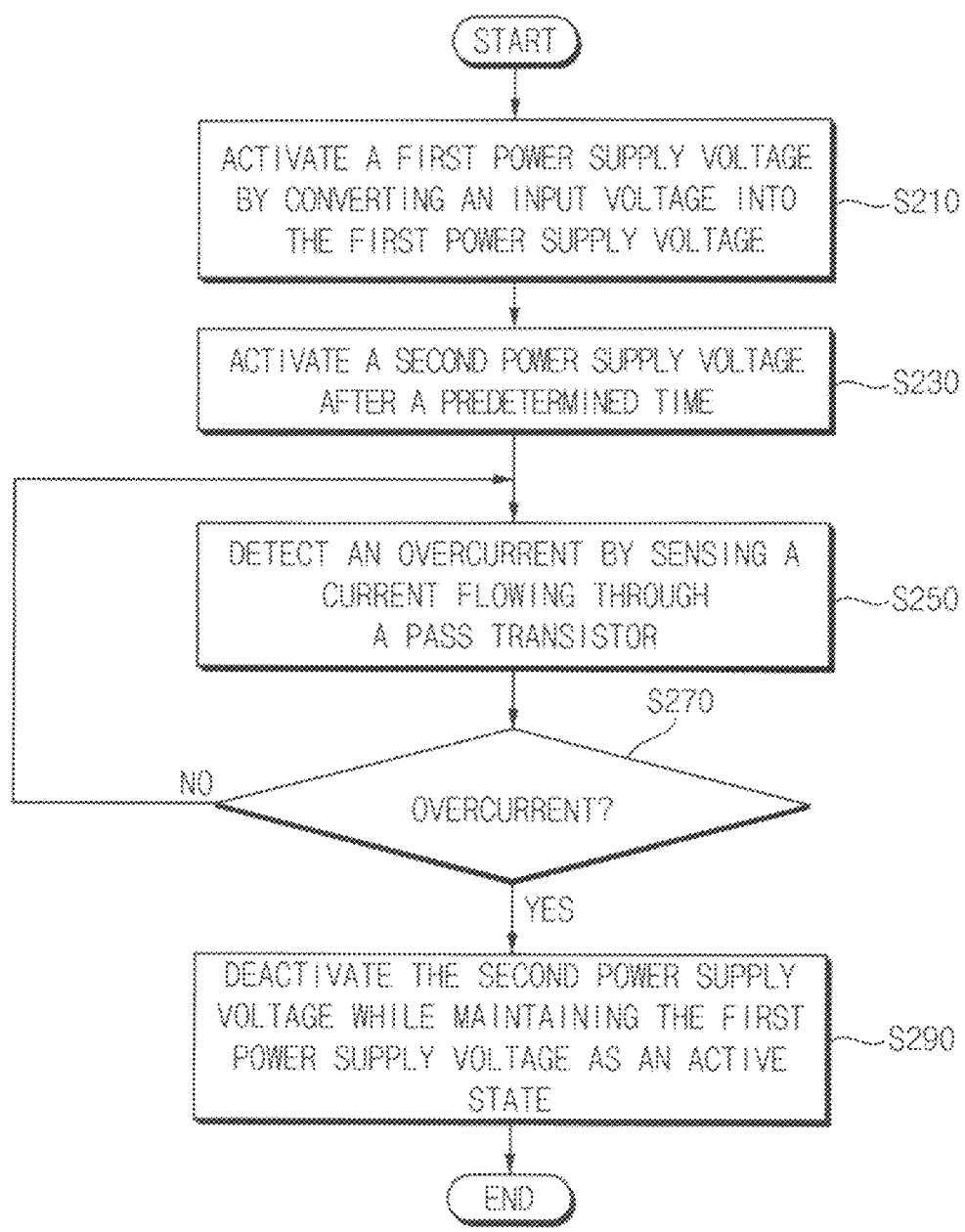
FIG. 6 is a flowchart illustrating a method of operating a power management circuit according to embodiments.

FIG. 6 is a flowchart illustrating a method of operating a power management circuit according to embodiments.

Referring to FIGS. 3 and 6, a boost converter 120a may activate a first power supply voltage PAVDD by converting an input voltage VIN into the first power supply voltage PAVDD (S210). A pass transistor PTR may be turned on after a predetermined time from a time point at which the first power supply voltage PAVDD is activated, and thus a second power supply voltage AVDD may be activated after the predetermined time from the time point at which the first power supply voltage PAVDD is activated (S230).

An overcurrent detect circuit 140 may detect an overcurrent of the pass transistor PTR by sensing a current flowing through the pass transistor PTR (S250). For example, a proportion current that is proportional to the current of the pass transistor PTR may flow through a sensing transistor STR, an output node NO may have a current sensing voltage CSV corresponding to the proportion current of the sensing transistor STR, and an overcurrent detect signal OCD may be generated by comparing the current sensing voltage CSV a reference voltage VREF corresponding to a reference current level. In a case where the overcurrent of the pass transistor PTR is not detected (S270: NO), the second power supply voltage AVDD may be maintained as an active state, and the overcurrent detect circuit 140 may continuously perform an overcurrent detect operation (S250).

In a case where the overcurrent of the pass transistor PTR is detected (S270: YES), or in a case where the overcurrent detect signal OCD has an active level, the pass transistor PTR may be turned off, and the second power supply voltage AVDD may be deactivated while the first power supply voltage PAVDD is maintained as an active state (S290). As described above, since the overcurrent detect operation is performed based on the current of the pass transistor PTR, or the proportion current of the sensing transistor STR that is proportional to the current of the pass transistor PTR, even if a minute short defect related to the second power supply voltage AVDD transferred or activated by the pass transistor PTR occurs, the overcurrent of the pass transistor PTR may be readily detected, and the second power supply voltage AVDD may be deactivated.

Figure 7:
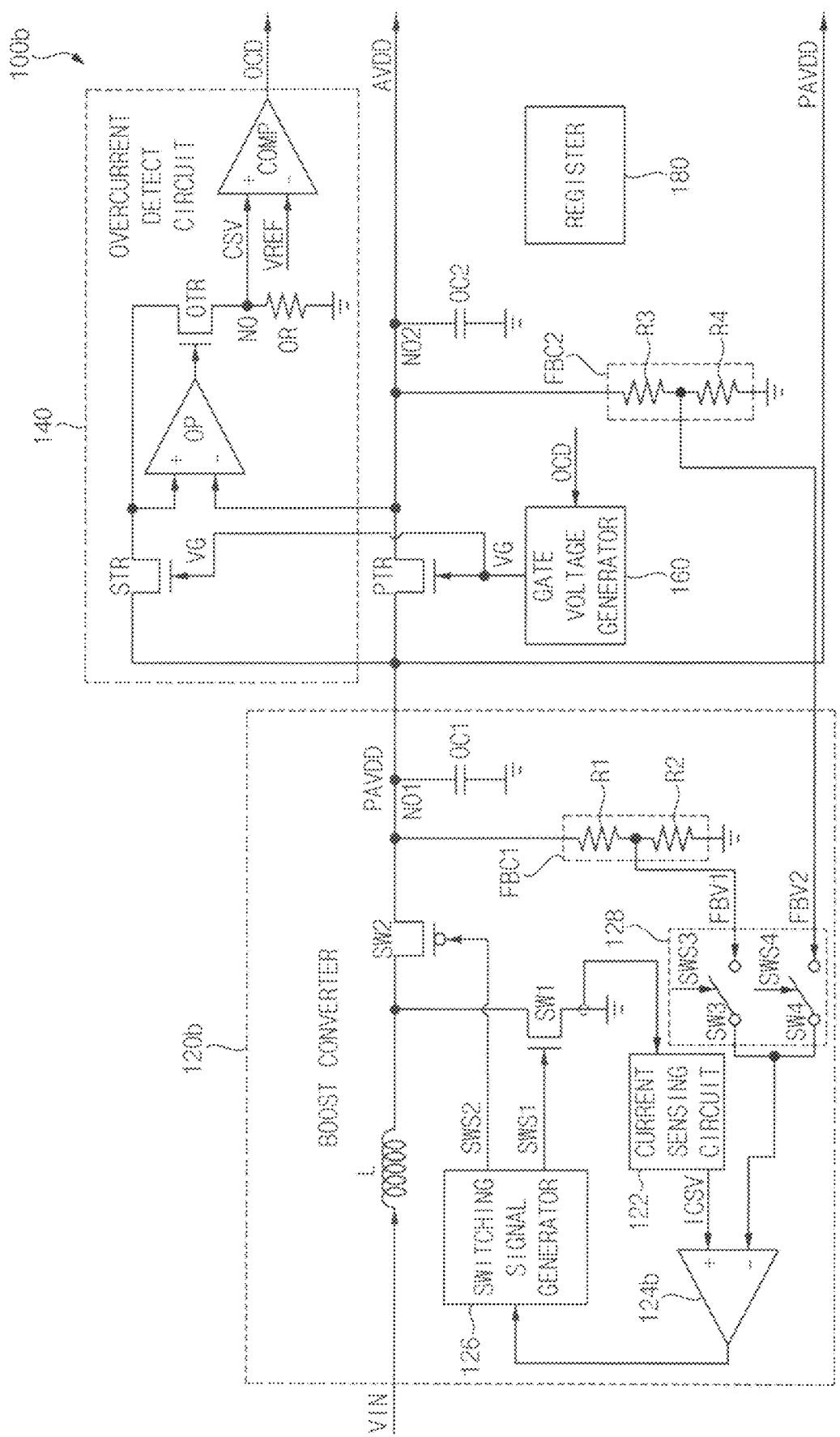
FIG. 7 is a diagram illustrating a power management circuit according to embodiments.
Figure 8:
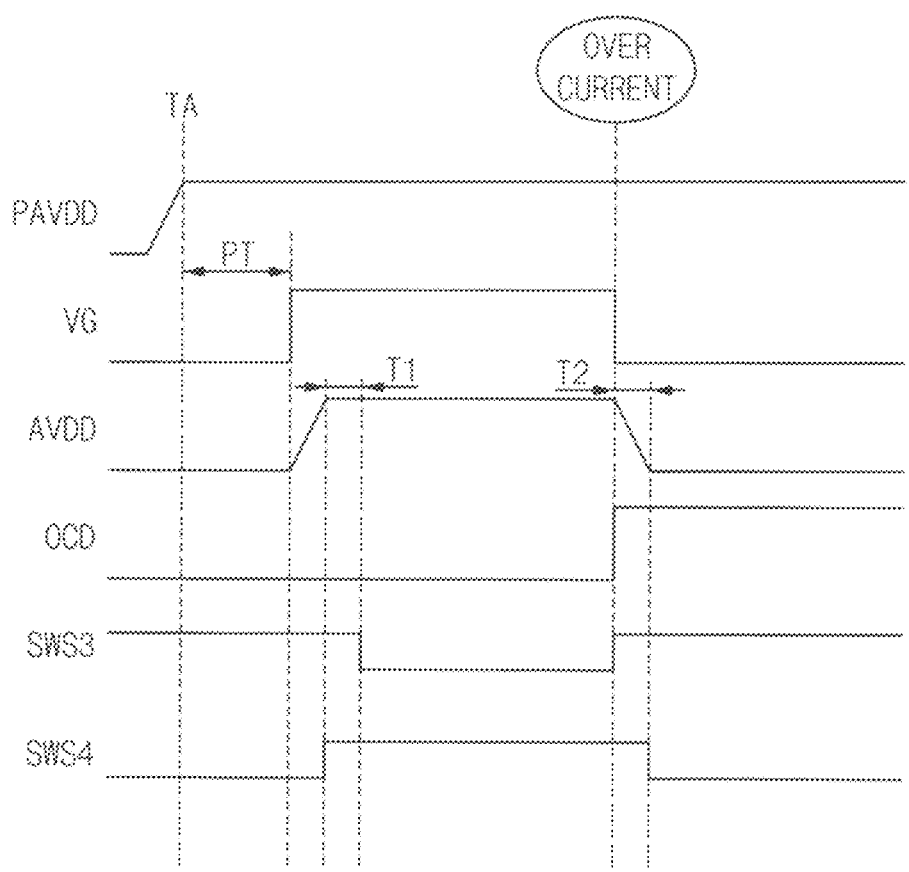
FIG. 8 is a timing diagram for describing an example of an operation of a power management circuit according to embodiments.

FIG. 7 is a diagram illustrating a power management circuit according to embodiments, and FIG. 8 is a timing diagram for describing an example of an operation of a power management circuit according to embodiments.

Referring to FIG. 7, a power management circuit 100b may include a boost converter 120b, a pass transistor PTR, an overcurrent detect circuit 140, a gate voltage generator 160, a register 180, a second output capacitor OC2 and a second feedback circuit FBC2. The power management circuit 100b of FIG. 7 may have a similar configuration and a similar operation to a power management circuit 100a of FIG. 3, except that the power management circuit 100b may further include the second feedback circuit FBC2, and that the boost converter 120b may further include a feedback select circuit 128.

A first feedback circuit FBC1 of the boost converter 120b may be coupled between a first output node NO1 at which a first power supply voltage PAVDD is output and a ground voltage line, and may generate a first feedback voltage FBV1 based on the first power supply voltage PAVDD. The second feedback circuit FBC2 may be coupled between a second output node NO2 at which a second power supply voltage AVDD is output and the ground voltage line, and may generate a second feedback voltage FBV2 based on the second power supply voltage AVDD. In some embodiments, the second feedback circuit FBC2 may be implemented as a voltage divider, and may generate the second feedback voltage FBV2 by dividing the second power supply voltage AVDD. For example, the second feedback circuit FBC2 may include a third resistor R3 coupled between the second output node NO2 and a node at which the second feedback voltage FBV2 is output, and a fourth resistor R4 coupled between the node at which the second feedback voltage FBV2 is output and the ground voltage line. A comparator 124b may receive an inductor current sensing voltage ICSV corresponding to a current of an inductor L at a first input terminal (e.g. a positive input terminal), and may receive the first feedback voltage FBV1, the second feedback voltage FBV2, or a sum of the first feedback voltage FBV1 and the second feedback voltage FBV2 at a second input terminal (e.g. a negative input terminal). The feedback select circuit 128 may provide the first feedback voltage FBV1 to the second input terminal of the comparator 124b in response to a third switching signal SWS3, and may provide the second feedback voltage FBV2 to the second input terminal of the comparator 124b in response to a fourth switching signal SWS4. In some embodiments, the feedback select circuit 128 may include a third switching transistor SW3 that is turned on in response to the third switching signal SWS3, and a fourth switching transistor SW4 that is turned on in response to the fourth switching signal SWS4.

In the power management circuit 100b according to embodiments, the boost converter 120b may adjust a voltage level of the first power supply voltage PAVDD based on the first feedback voltage FBV1 generated based on the first power supply voltage PAVDD before the second power supply voltage AVDD is activated, may adjust the voltage level of the first power supply voltage PAVDD based on the second feedback voltage FBV2 generated based on the second power supply voltage AVDD after the second power supply voltage AVDD is activated, and may adjust the voltage level of the first power supply voltage AVDD again based on the first feedback voltage FBV1 in a case where an overcurrent of the pass transistor PTR is detected by an overcurrent detect operation of the overcurrent detect circuit 140.

To perform these operations, as illustrated in the timing diagram of FIG. 8, before the second power supply voltage AVDD is activated, the third switching signal SWS3 may have an active level (e.g., a high level), and the fourth switching signal SWS4 may have an inactive level (e.g., a low level). Thus, the third switching transistor SW3 may be turned on, the fourth switching transistor SW4 may be turned off, and the feedback select circuit 128 may provide the first feedback voltage FBV1 to the second input terminal of the comparator 124b. The comparator 124b may generate an output signal by comparing the inductor current sensing voltage ICSV with the first feedback voltage FBV1, and a switching signal generator 126 may control first and second switching transistors SW1 and SW2 in response to the output signal of the comparator 124b. Accordingly, the boost converter 120b may adjust the voltage level of the first power supply voltage PAVDD based on the first feedback voltage FBV1.

After the second power supply voltage AVDD is activated, the third switching signal SWS3 may have the inactive level, and the fourth switching signal SWS4 may have the active level. Thus, the third switching transistor SW3 may be turned off, the fourth switching transistor SW4 may be turned on, and the feedback select circuit 128 may provide the second feedback voltage FBV2 to the second input terminal of the comparator 124b. The comparator 124b may generate the output signal by comparing the inductor current sensing voltage ICSV with the second feedback voltage FBV2, and the switching signal generator 126 may control the first and second switching transistors SW1 and SW2 in response to the output signal of the comparator 124b. Accordingly, the boost converter 120b may adjust the voltage level of the first power supply voltage PAVDD based on the second feedback voltage FBV2. Although the pass transistor PTR is turned on, the pass transistor PTR may have an on-resistance, and thus the second power supply voltage AVDD may have a voltage level lower than a desired voltage level due to the on-resistance of the pass transistor PTR. However, since the voltage level of the first power supply voltage PAVDD is adjusted according to the second feedback voltage FBV2 generated based on the second power supply voltage AVDD, a voltage drop of the second power supply voltage AVDD caused by the on-resistance of the pass transistor PTR may be compensated, and the second power supply voltage AVDD may have the desired voltage level.

In a case where an overcurrent of the pass transistor PTR is detected by the overcurrent detect operation after the second power supply voltage AVDD is activated, the third switching signal SWS3 may have the active level, and the fourth switching signal SWS4 may have the inactive level. Thus, the third switching transistor SW3 may be turned on, the fourth switching transistor SW4 may be turned off, and the feedback select circuit 128 may provide the first feedback voltage FBV1 to the second input terminal of the comparator 124b. The comparator 124b may generate the output signal by comparing the inductor current sensing voltage ICSV with the first feedback voltage FBV1, and the switching signal generator 126 may control the first and second switching transistors SW1 and SW2 in response to the output signal of the comparator 124b. Accordingly, the boost converter 120b may adjust the voltage level of the first power supply voltage PAVDD based on the first feedback voltage FBV1. Thus, in the case where the overcurrent of the pass transistor PTR is detected, even if the second power supply voltage AVDD is deactivated, the boost converter 120b may generate the first power supply voltage PAVDD having a desired voltage level.

In some embodiments, to prevent an inrush current when the third switching transistor SW3 and/or the fourth switching transistor SW4 are turned on or off, an active period of the third switching signal SWS3 may partially overlap an active period of the fourth switching signal SWS4. For example, as illustrated in FIG. 8, during a first time T1 from a time point at which the second power supply voltage AVDD is activated, both of the third switching signal SWS3 and the fourth switching signal SWS4 may have the active level. Accordingly, a voltage applied to the second input terminal of the comparator 124b may be stably changed from the first feedback voltage FBV1 to the second feedback voltage FBV2 without the inrush current. Further, after the first time T1, the third switching signal SWS3 may have the inactive level, and the fourth switching signal SWS4 may have the active level. During a second time T2 from a time point at which the overcurrent of the pass transistor PTR is detected, both of the third switching signal SWS3 and the fourth switching signal SWS4 may have the active level. Accordingly, the voltage applied to the second input terminal of the comparator 124b may be stably changed from the second feedback voltage FBV2 to the first feedback voltage FBV1 without the inrush current. After the second time T2, the third switching signal SWS3 may have the active level, and the fourth switching signal SWS4 may have the inactive level.

In the power management circuit 100b according to embodiments, the overcurrent detect circuit 140 may perform an overcurrent detect operation by sensing a current flowing through the pass transistor PTR. Accordingly, even if a minute short defect related to the second power supply voltage AVDD transferred or activated by the pass transistor PTR occurs, the power management circuit 100b may readily detect the overcurrent of the pass transistor PTR, and may deactivate the second power supply voltage AVDD. Further, in the power management circuit 100b, after the second power supply voltage AVDD is activated and before the overcurrent of the pass transistor PTR occurs, the boost converter 120b may adjust the voltage level of the first power supply voltage PAVDD according to the second feedback voltage FBV2 generated based on the second power supply voltage AVDD transferred or activated by the pass transistor PTR. Accordingly, the voltage drop of the second power supply voltage AVDD caused by the on-resistance of the pass transistor PTR may be compensated.

Figure 9:
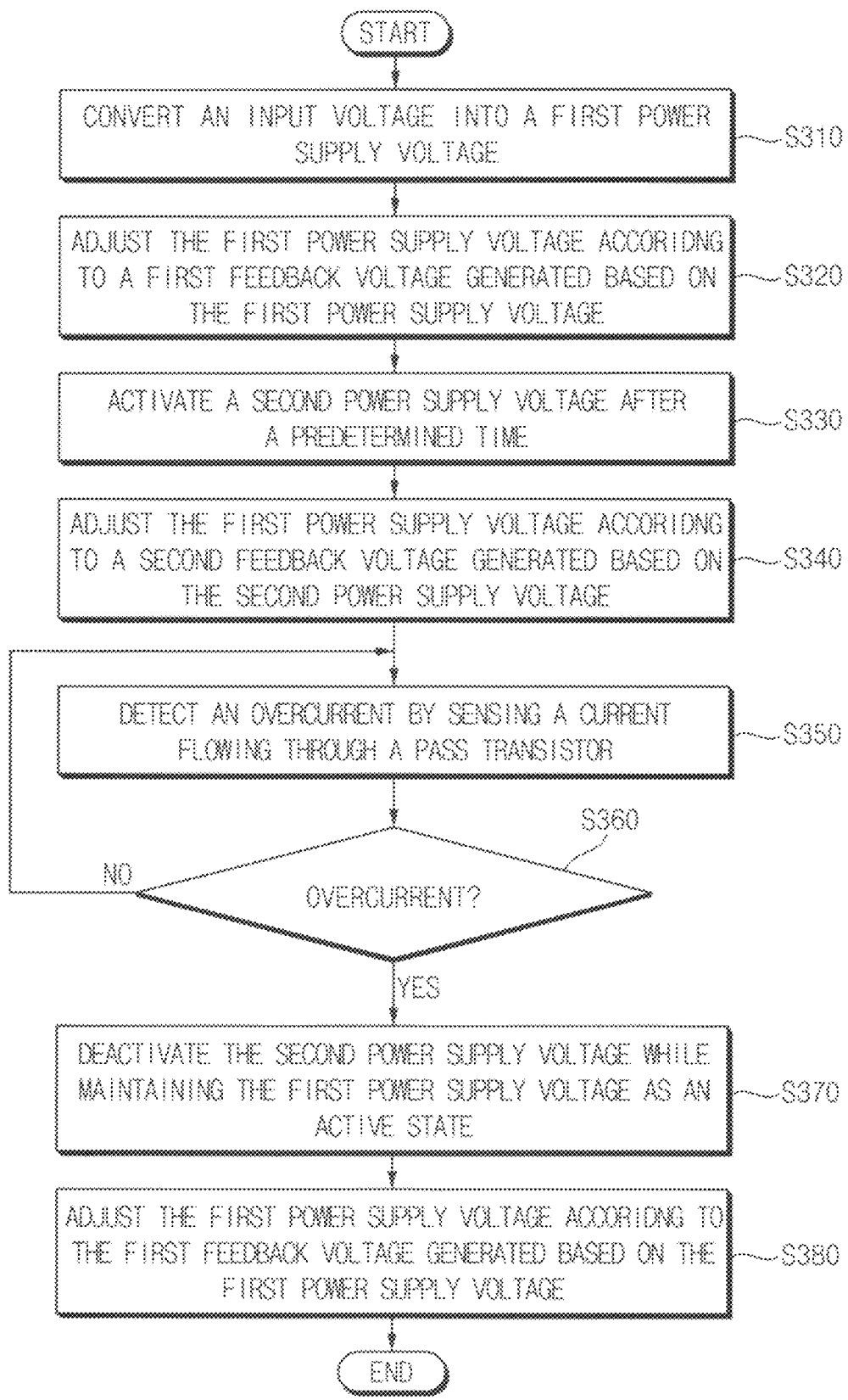
FIG. 9 is a flowchart illustrating a method of operating a power management circuit according to embodiments.

FIG. 9 is a flowchart illustrating a method of operating a power management circuit according to embodiments.

Referring to FIGS. 7 and 9, a boost converter 120b may convert an input voltage VIN into a first power supply voltage PAVDD (S310), and may adjust a voltage level of the first power supply voltage PAVDD according to a first feedback voltage FBV1 generated based on the first power supply voltage PAVDD (S320).

A pass transistor PTR may be turned on after a predetermined time from a time point at which the first power supply voltage PAVDD is activated, and thus a second power supply voltage AVDD may be activated after the predetermined time from the time point at which the first power supply voltage PAVDD is activated (S330). If the second power supply voltage AVDD is activated, the boost converter 120b may adjust the voltage level of the first power supply voltage PAVDD according to a second feedback voltage FBV2 generated based on the second power supply voltage AVDD (S340). Accordingly, a voltage drop of the second power supply voltage AVDD caused by an on-resistance of the pass transistor PTR may be compensated.

An overcurrent detect circuit 140 may detect an overcurrent of the pass transistor PTR by sensing a current flowing through the pass transistor PTR (S350). In a case where the overcurrent of the pass transistor PTR is not detected (S360: NO), the second power supply voltage AVDD may be maintained as an active state, and the overcurrent detect circuit 140 may continuously perform an overcurrent detect operation (S350).

In a case where the overcurrent of the pass transistor PTR is detected (S360: YES), the pass transistor PTR may be turned off, and the second power supply voltage AVDD may be deactivated while the first power supply voltage PAVDD is maintained as an active state (S370). If the second power supply voltage AVDD is deactivated, the boost converter 120b may adjust the voltage level of the first power supply voltage PAVDD again according to the first feedback voltage FBV1 generated based on the first power supply voltage PAVDD (S380).

Figure 10:
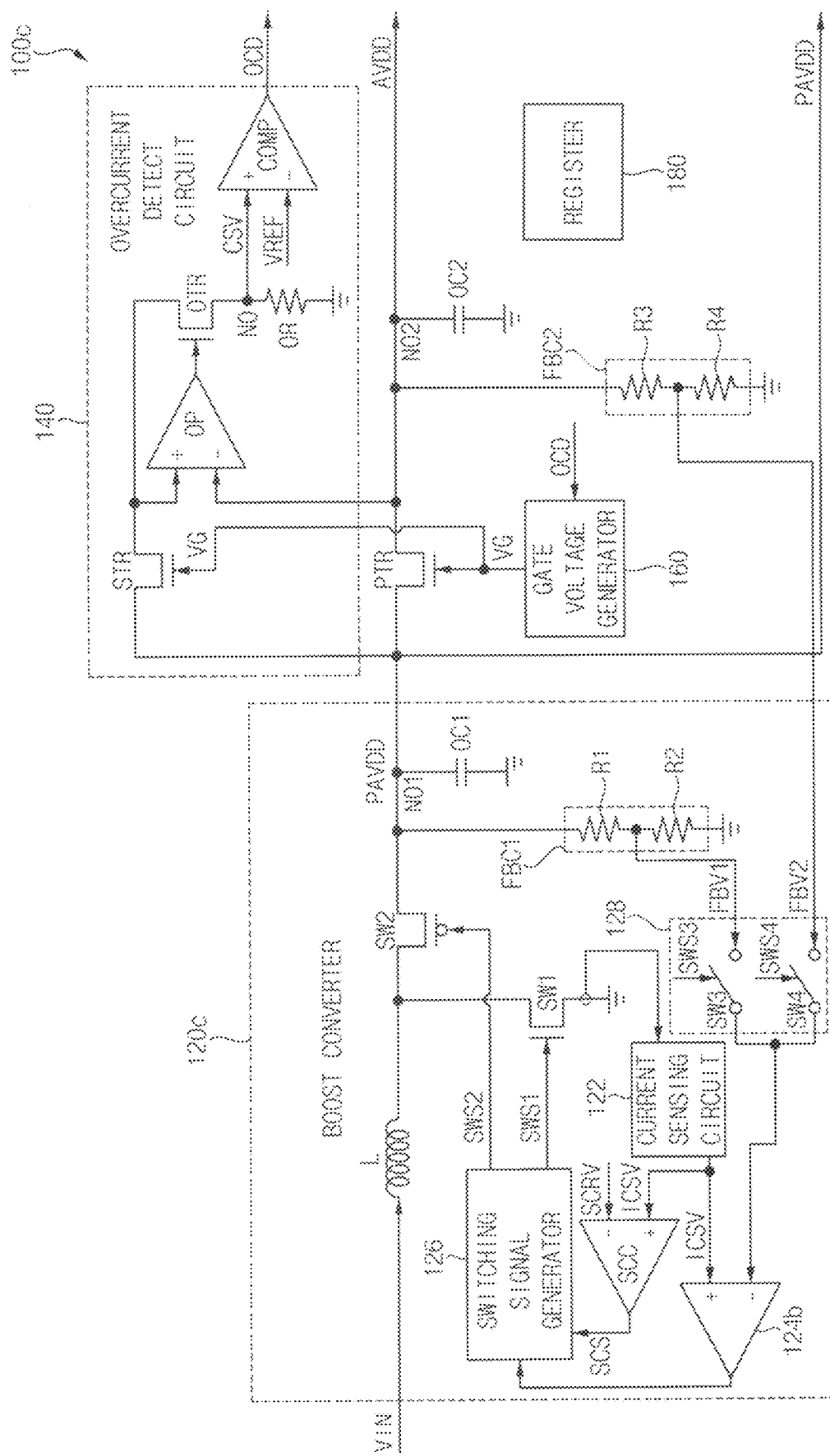
FIG. 10 is a diagram illustrating a power management circuit according to embodiments.

FIG. 10 is a diagram illustrating a power management circuit according to embodiments.

Referring to FIG. 10, a power management circuit 100c may include a boost converter 120c, a pass transistor PTR, an overcurrent detect circuit 140, a gate voltage generator 160, a register 180, a second output capacitor OC2 and a second feedback circuit FBC2. The power management circuit 100c of FIG. 10 may have a similar configuration and a similar operation to a power management circuit 100a of FIG. 3 or a power management circuit 100b of FIG. 7, except that the boost converter 120c may further include a short circuit comparator SCC.

The short circuit comparator SCC of the boost converter 120c may receive an inductor current sensing voltage ICSV from a current sensing circuit 122 at a first input terminal (e.g. a positive input terminal), and may receive a short circuit reference voltage SCRV corresponding to a short circuit current level at a second input terminal (e.g. a negative input terminal). The short circuit current level may be, but not be limited to, a threshold or criterion of a power-off of the boost converter 120c. The short circuit comparator SCC may generate a short circuit signal SCS by comparing the inductor current sensing voltage ICSV with the short circuit reference voltage SCRV. For example, in a case where the inductor current sensing voltage ICSV is higher than the short circuit reference voltage SCRV, the short circuit comparator SCC may generate the short circuit signal SCS having an active level. A switching signal generator 126 may change a first switching signal SWS1 and a second switching signal SWS2 to an inactive level in response to the short circuit signal SCS having the active level. Accordingly, both of first and second switching transistors SW1 and SW2 may be turned off, and a first power supply voltage PAVDD may be deactivated.

Figure 11:
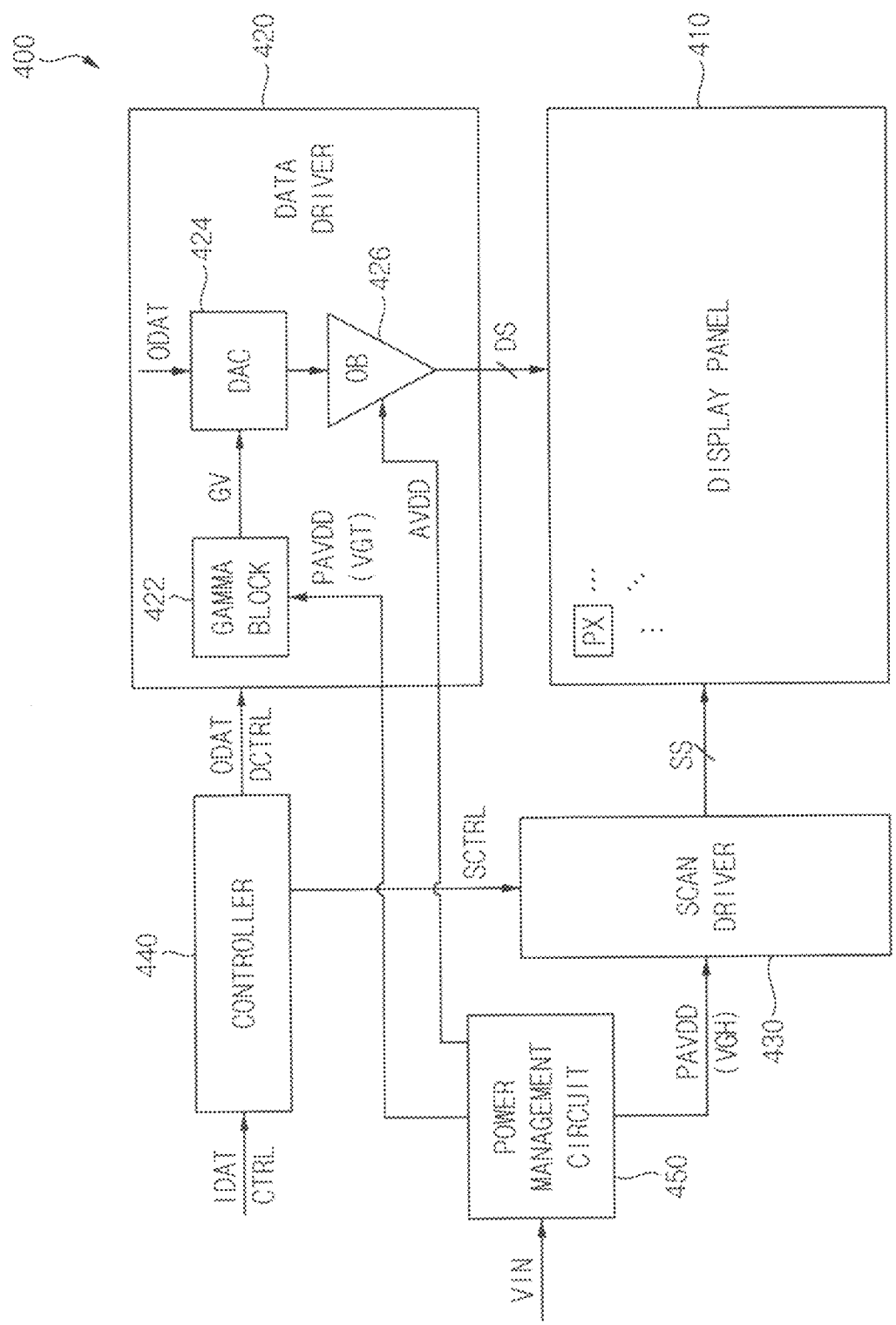
FIG. 11 is a block diagram illustrating a display device including a power management circuit according to embodiments.

FIG. 11 is a block diagram illustrating a display device including a power management circuit according to embodiments.

Referring to FIG. 11, a display device 400 according to embodiments may include a display panel 410 that includes a plurality of pixels PX, a data driver 420 that provides data signals DS to the plurality of pixels PX, a scan driver 430 that provides scan signals SS to the plurality of pixels PX, a controller 440 that controls the data driver 420 and the scan driver 430, and a power management circuit 450 that generates power supply voltages PAVDD and AVDD of the display device 400.

The display panel 410 may include data lines, scan lines, and the plurality of pixels PX coupled to the data lines and the scan lines. In some embodiments, each pixel PX may include at least two transistors, at least one capacitor and a light emitting element, and the display panel 410 may be a light emitting display panel. For example, the light emitting element may be an organic light emitting diode (OLED), and the display panel 410 may be an OLED display panel. In other examples, the light emitting element may be a nano light emitting diode (NED), a quantum dot (QD) light emitting diode, a micro light emitting diode, an inorganic light emitting diode, or any other suitable light emitting element. In other embodiments, each pixel PX may include a switching transistor and a liquid crystal capacitor coupled to the switching transistor, and the display panel 410 may be a liquid crystal display (LCD) panel. However, the display panel 410 is not limited to the light emitting display panel and the LCD panel, and may be any other suitable display panel.

The data driver 420 may generate the data signal DS based on a data control signal DCTRL and output image data ODAT received from the controller 440, and may provide the data signals DS to the plurality of pixels PX through the data lines. In some embodiments, the data control signal DCTRL may include, but not limited to, an output data enable signal, a horizontal start signal and a load signal. In some embodiments, the data driver 420 may include a gamma block 422 that generates gamma voltages GV (or gray voltages), digital-to-analog converters (DAC) 424 that convert the output image data ODAT into the data signals DS based on the gamma voltages GV, and output buffers (OB) 426 that output the data signals DS to the data lines. In some embodiments, the data driver 420 may further include, but not limited to, a shift register that generates sampling signals, and a plurality of latches that temporarily stores the output image data ODAT in response to the sampling signals. In some embodiments, the data driver 420 and the controller 440 may be implemented with a single integrated circuit, and the single integrated circuit may be referred to as a timing controller embedded data driver (TED). In other embodiments, the data driver 420 and the controller 440 may be implemented with separate integrated circuits.

The scan driver 430 may generate the scan signals SS based on a scan control signal SCTRL received from the controller 440, and may sequentially provide the scan signals SS to the plurality of pixels PX on a row-by-row basis through the scan lines. In some embodiments, the scan control signal SCTRL may include, but not limited to, a scan start signal and a scan clock signal. In some embodiments, the scan driver 430 may be integrated or formed in a peripheral portion of the display panel 410. In other embodiments, the scan driver 430 may be implemented with one or more integrated circuits.

The controller 440 (e.g., a timing controller (TCON)) may receive input image data IDAT and a control signal CTRL from an external host processor (e.g., an application processor (AP), a graphics processing unit (GPU) or a graphics card). In some embodiments, the control signal CTRL may include, but not limited to, a vertical synchronization signal, a horizontal synchronization signal, an input data enable signal, a master clock signal, or the like. The controller 440 may generate the data control signal DCTRL, the scan control signal SCTRL and the output image data ODAT based on the control signal CTRL and the input image data IDAT. The controller 440 may control an operation of the data driver 420 by providing the data control signal DCTRL and the output image data ODAT to the data driver 420, and may control an operation of the scan driver 430 by providing the scan control signal SCTRL to the scan driver 430.

The power management circuit 450 may generate a first power supply voltage PAVDD and a second power supply voltage AVDD based on an input voltage VIN. The power management circuit 450 may first activate the first power supply voltage PAVDD, and may activate the second power supply voltage AVDD after a predetermined time. The power management circuit 450 may provide the first power supply voltage PAVDD or a high gate voltage VGH generated based on the first power supply voltage PAVDD to the scan driver 430. The power management circuit 450 may provide the first power supply voltage PAVDD as a gamma top voltage VGT to the gamma block 422 of the data driver 420. The gamma block 422 may generate the gamma voltages GV by dividing the gamma top voltage VGT. Further, the power management circuit 450 may provide the second power supply voltage AVDD to the output buffers 426 of the data driver 420. The output buffers 426 may operate based on the second power supply voltage AVDD.

According to embodiments, the power management circuit 450 may be a power management circuit 100 of FIG. 1, a power management circuit 100*a* of FIG. 3, a power management circuit 100*b* of FIG. 7 or a power management circuit 100*c* of FIG. 10. In the power management circuit 450, an overcurrent detect circuit may perform an overcurrent detect operation by sensing a current flowing through a pass transistor. Accordingly, even if a minute short defect related to the second power supply voltage AVDD transferred or activated by the pass transistor occurs, the power management circuit 450 may deactivate the second power supply voltage AVDD. Further, in some embodiments, in the power management circuit 450, a boost converter may adjust a voltage level of the first power supply voltage PAVDD according to a second feedback voltage generated based on the second power supply voltage AVDD transferred or activated by the pass transistor. Accordingly, a voltage drop of the second power supply voltage AVDD caused by an on-resistance of the pass transistor may be compensated.

Figure 12:
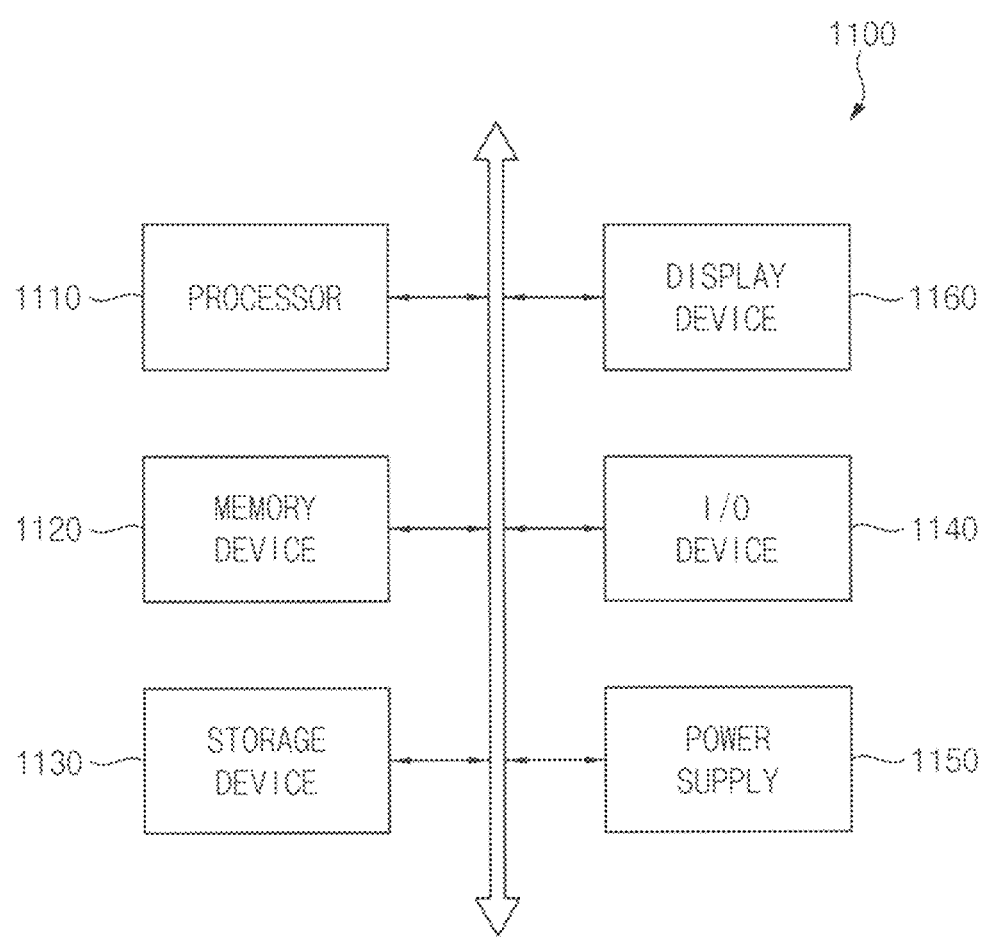
FIG. 12 is a block diagram illustrating an electronic device including a display device according to embodiments.

FIG. 12 is a block diagram illustrating an electronic device including a display device according to embodiments.

Referring to FIG. 12, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM)

device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc, and an output device such as a printer, a speaker, etc. The power supply 1150 may supply power for operations of the electronic device 1100. The display device 1160 may be coupled to other components through the buses or other communication links.

In a power management circuit of the display device 1160, an overcurrent detect operation may be performed by sensing a current flowing through a pass transistor. Accordingly, even if a minute short defect related to a second power supply voltage transferred or activated by the pass transistor occurs, an overcurrent of the pass transistor may be readily detected, and the second power supply voltage may be deactivated. Further, in some embodiments, a voltage level of a first power supply voltage may be adjusted according to a second feedback voltage generated based on the second power supply voltage transferred or activated by the pass transistor. Accordingly, a voltage drop of the second power supply voltage caused by an on-resistance of the pass transistor may be compensated.

The inventive concepts may be applied any electronic device 1100 including the display device 1160. For example, the inventive concepts may be applied to a mobile phone, a smart phone, a tablet computer, a virtual reality (VR) device, a television (TV), a digital TV, a 3D TV, a wearable electronic device, a personal computer (PC), a home appliance, a laptop computer, a personal digital assistant (PDA), a portable multimedia player (PMP), a digital camera, a music player, a portable game console, a navigation device, etc.

While the present disclosure has been described with reference to embodiments thereof, it will be apparent to those of ordinary skill in the art that various changes and modifications may be made thereto without departing from the scope and spirit of the present disclosure as set forth in the following claims.

What is claimed is:

1. A power management circuit comprising:
a pass transistor configured to transfer a first voltage at a first output node to a second output node as a second voltage after a predetermined time from a time point at which the first voltage is activated; and
an overcurrent detect circuit configured to detect an overcurrent of the pass transistor,
wherein, in a case where the overcurrent of the pass transistor is detected, the second voltage is deactivated, and the first voltage is maintained as an active state,
wherein the overcurrent detect circuit includes:
a pass transistor current sensing circuit configured to generate a current sensing voltage by sensing a current flowing through the pass transistor; and
a comparator configured to generate an overcurrent detect signal by comparing the current sensing voltage with a reference voltage, and
wherein the pass transistor current sensing circuit includes a sensing transistor, an operational amplifier, an output transistor and an output resistor.

2. The power management circuit of claim 1, further comprising:
a boost converter configured to convert an input voltage into the first voltage.

3. The power management circuit of claim 1, wherein the first voltage is used to generate a high gate voltage and a gamma voltage, and the second is used as a power supply voltage for an output buffer of a data driver.

4. The power management circuit of claim 1, wherein a reference current level corresponding to the reference voltage is set by a register option.

5. The power management circuit of claim 1, wherein the overcurrent detect circuit generates the overcurrent detect signal in a case where the current sensing voltage is maintained to be higher than the reference voltage for a reference hold time.

6. The power management circuit of claim 5, wherein the reference hold time is set by a register option.

7. The power management circuit of claim 1, further comprising:
a gate voltage generator configured to generate a gate voltage applied to a gate of the pass transistor,
wherein the gate voltage generator generates the gate voltage having an active level after the predetermined time from the time point at which the first voltage is activated, and generates the gate voltage having an inactive level in response to the overcurrent detect signal.

8. The power management circuit of claim 1, wherein the predetermined time from the time point at which the first voltage is activated to a time point at which the second voltage is started to be activated is set by a register option.

9. The power management circuit of claim 1, wherein the sensing transistor includes a gate for receiving a gate voltage applied to a gate of the pass transistor, a first terminal coupled to a first terminal of the pass transistor, and a second terminal,
wherein the operational amplifier includes a first input terminal coupled to the second terminal of the sensing transistor, a second input terminal coupled to a second terminal of the pass transistor, and an output terminal,
wherein the output transistor includes a gate coupled to the output terminal of the operational amplifier, a first terminal coupled to the second terminal of the sensing transistor, and a second terminal coupled to an output node,
wherein the output resistor is coupled between the output node and a ground voltage line, and
wherein the comparator includes a first input terminal coupled to the output node, a second input terminal for receiving the reference voltage corresponding to a reference current level, and an output terminal for outputting the overcurrent detect signal.

10. The power management circuit of claim 1, further comprising:
a boost converter configured to convert an input voltage into the first voltage,
wherein the boost converter includes:
an inductor including a first terminal for receiving the input voltage, and a second terminal;
a first switching transistor including a gate for receiving a first switching signal, a first terminal coupled to the second terminal of the inductor, and a second terminal coupled to a ground voltage line;

a second switching transistor including a gate for receiving a second switching signal, a first terminal coupled to the second terminal of the inductor, and a second terminal coupled to the first output node at which the first voltage is output;

a first feedback circuit coupled between the first output node and the ground voltage line, and configured to generate a first feedback voltage based on the first voltage;

a current sensing circuit configured to generate an inductor current sensing voltage corresponding to a current flowing from the inductor through the first switching transistor;

a second comparator including a first input terminal for receiving the inductor current sensing voltage, a second terminal for receiving the first feedback voltage, and an output terminal for outputting an output signal; and a switching signal generator configured to generate the first switching signal and the second switching signal based on the output signal of the second comparator.

11. The power management circuit of claim 1, further comprising:

a boost converter configured to convert an input voltage into the first voltage, wherein, before the second voltage is activated, the boost converter adjusts a voltage level of the first voltage based on a first feedback voltage generated based on the first voltage, wherein, after the second voltage is activated, the boost converter adjusts the voltage level of the first voltage based on a second feedback voltage generated based on the second voltage, and wherein, in the case where the overcurrent of the pass transistor is detected, the boost converter adjusts the voltage level of the first voltage based on the first feedback voltage.

12. The power management circuit of claim 1, further comprising:

a boost converter configured to convert an input voltage into the first voltage; and a second feedback circuit coupled between the second output node at which the second voltage is output and a ground voltage line, and configured to generate a second feedback voltage based on the second voltage, wherein the boost converter includes:

an inductor including a first terminal for receiving the input voltage, and a second terminal;

a first switching transistor including a gate for receiving a first switching signal, a first terminal coupled to the second terminal of the inductor, and a second terminal coupled to the ground voltage line;

a second switching transistor including a gate for receiving a second switching signal, a first terminal coupled to the second terminal of the inductor, and a second terminal coupled to the first output node at which the first voltage is output;

a first feedback circuit coupled between the first output node and the ground voltage line, and configured to generate a first feedback voltage based on the first voltage;

a current sensing circuit configured to generate an inductor current sensing voltage corresponding to a current flowing from the inductor through the first switching transistor;

a second comparator including a first input terminal for receiving the inductor current sensing voltage, a second terminal, and an output terminal for outputting an output signal;

a feedback select circuit configured to provide the first feedback voltage to the second input terminal of the comparator in response to a third switching signal, and to provide the second feedback voltage to the second input terminal of the second comparator in response to a fourth switching signal; and a switching signal generator configured to generate the first switching signal and the second switching signal based on the output signal of the second comparator.

13. The power management circuit of claim 12, wherein, before the voltage is activated, the second comparator generates the output signal by comparing the inductor current sensing voltage with the first feedback voltage, wherein, after the second voltage is activated, the second comparator generates the output signal by comparing the inductor current sensing voltage with the second feedback voltage, and wherein, in the case where the overcurrent of the pass transistor is detected, the second comparator generates the output signal by comparing the inductor current sensing voltage with the first feedback voltage.

14. The power management circuit of claim 12, wherein, before the second voltage is activated, the third switching signal has an active level, and the fourth switching signal has an inactive level, wherein, during a first time from a time point at which the second voltage is activated, both of the third switching signal and the fourth switching signal have the active level, wherein, after the first time, the third switching signal has the inactive level, and the fourth switching signal has the active level, wherein, during a second time from a time point at which the overcurrent of the pass transistor is detected, both of the third switching signal and the fourth switching signal have the active level, and wherein, after the second time, the third switching signal has the active level, and the fourth switching signal has the inactive level.

15. The power management circuit of claim 12, wherein the boost converter further includes:

a short circuit comparator configured to generate a short circuit signal by comparing the inductor current sensing voltage with a short circuit reference voltage corresponding to a short circuit current level, and wherein the switching signal generator changes the first switching signal and the second switching signal to an inactive level in response to the short circuit signal.

16. A power management circuit comprising:

a boost converter configured to convert an input voltage into a first voltage, and including a first feedback circuit configured to generate a first feedback voltage based on the first voltage;

a pass transistor configured to transfer the first voltage as a second voltage after a predetermined time from a time point at which the first voltage is activated;

a second feedback circuit configured to generate a second feedback voltage based on the second voltage; and an overcurrent detect circuit configured to detect an overcurrent by sensing a current flowing through the pass transistor.

17. The power management circuit of claim 16, wherein the overcurrent detect circuit includes a sensing transistor through which a proportion current that is proportional to the current flowing through the pass transistor flows, compares a current sensing voltage corresponding to the proportion current of the sensing transistor with a reference voltage corresponding to a reference current level, and generates an overcurrent detect signal in a case where the current sensing voltage is higher than the reference voltage.

18. The power management circuit of claim 16, wherein, before the second voltage is activated, the boost converter adjusts a voltage level of the first voltage based on the first feedback voltage, wherein, after the second voltage is activated, the boost converter adjusts the voltage level of the first voltage based on the second feedback voltage, and wherein, in a case where the overcurrent of the pass transistor is detected, the boost converter adjusts the voltage level of the first voltage based on the first feedback voltage.

19. An electronic device comprising:

a processor configured to provide input image data; and a display device configured to receive the input image data from the processor, and to display an image based on the input image data, the display device comprising:

a display panel including a plurality of pixels;

a data driver configured to provide data signals to the plurality of pixels;

a scan driver configured to provide scan signals to the plurality of pixels;

a controller configured to control the data driver and the scan driver; and a power management circuit configured to supply a first voltage and a second voltage to the data driver and the scan driver, the power management circuit comprising:

a pass transistor configured to transfer the first voltage at a first output node to a second output node as the second voltage after a predetermined time from a time point at which the first voltage is activated; and an overcurrent detect circuit configured to detect an overcurrent of the pass transistor, wherein, in a case where the overcurrent of the pass transistor is detected, the second voltage is deactivated, and the first voltage is maintained as an active state, wherein the overcurrent detect circuit includes:

a pass transistor current sensing circuit configured to generate a current sensing voltage by sensing a current flowing through the pass transistor; and a comparator configured to generate an overcurrent detect signal by comparing the current sensing voltage with a reference voltage, and wherein the pass transistor current sensing circuit includes a sensing transistor, an operational amplifier, an output transistor and an output resistor.

20. The display electronic device of claim 19, wherein the sensing transistor includes a gate for receiving a gate voltage applied to a gate of the pass transistor, a first terminal coupled to a first terminal of the pass transistor, and a second terminal, wherein the operational amplifier includes a first input terminal coupled to the second terminal of the sensing transistor, a second input terminal coupled to a second terminal of the pass transistor, and an output terminal, wherein the output transistor includes a gate coupled to the output terminal of the operational amplifier, a first terminal coupled to the second terminal of the sensing transistor, and a second terminal coupled to an output node, wherein the output resistor is coupled between the output node and a ground voltage line, and wherein the comparator includes a first input terminal coupled to the output node, a second input terminal for receiving the reference voltage corresponding to a reference current level, and an output terminal for outputting the overcurrent detect signal.

* * * * *